United States Patent [19]

Brutcher

[11] 4,037,710
[45] July 26, 1977

[54] ACCUMULATOR FOR OBJECT FEEDER
[75] Inventor: Donald W. Brutcher, Mattydale, N.Y.
[73] Assignee: Lipe-Rollway Corporation, Syracuse, N.Y.
[21] Appl. No.: 599,663
[22] Filed: July 28, 1975

Related U.S. Application Data

[63] Continuation-in-part of Ser. No. 487,385, July 11, 1974, abandoned.

[51] Int. Cl.² .............................................. B65G 27/00
[52] U.S. Cl. .................................... 198/443; 198/347; 198/580; 198/771
[58] Field of Search ................... 198/220 BA, 220 BC, 198/29, 40, 771, 453, 446, 580, 347, 443; 46/1 C

[56] References Cited
U.S. PATENT DOCUMENTS

| 2,632,588 | 3/1953 | Hoar | 198/40 X |
| 3,835,983 | 9/1974 | Horii | 198/220 BA |
| 3,841,471 | 10/1974 | Mead | 198/220 BA |

*Primary Examiner*—Evon C. Blunk
*Assistant Examiner*—Douglas D. Watts

*Attorney, Agent, or Firm*—Stonebraker, Shepard & Stephens

[57] ABSTRACT

An accumulator is formed alongside the main feed portion of a vibratory object feeder having a vibrated base covered with inclined pile material, and the accumulator is formed by arranging the pile in different bristle inclination directions. A removal portion of the accumulator receives objects crowded out of the feed portion, and a re-entry portion of the accumulator moves the crowded-out objects back into the feeder portion. The bristle inclination directions of the pile material in the accumulator cooperate to move the crowded-out objects in a generally arcuate swirl that re-enters the objects into the feed path as soon as space is available. A small number of crowded-out objects form a small diameter swirl, and the swirl diameter increases with increase in the number of crowded-out objects to accumulate as many objects as desired. Such an arrangement also re-enters the crowded-out objects into the main feed path as soon as space is available so there is no delay in waiting for the last of the crowded-out objects to arrive at the output.

5 Claims, 7 Drawing Figures

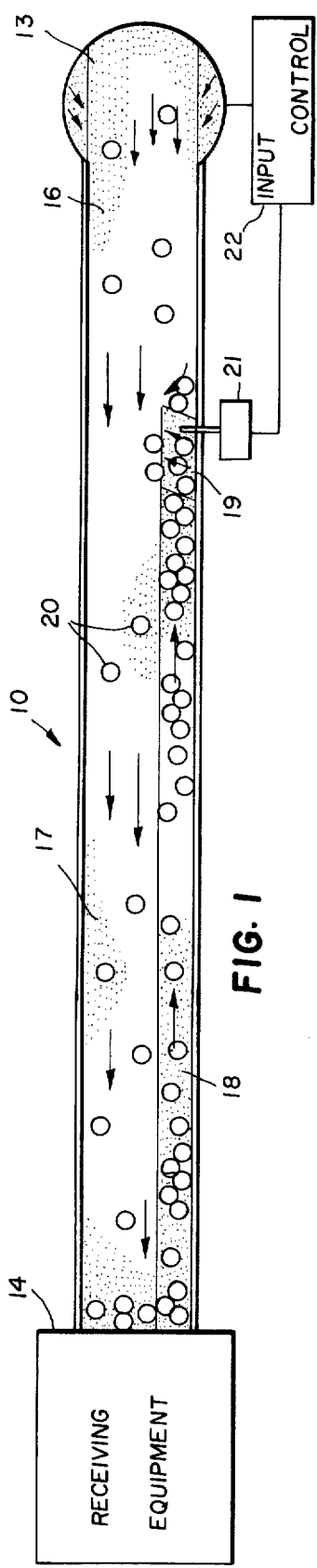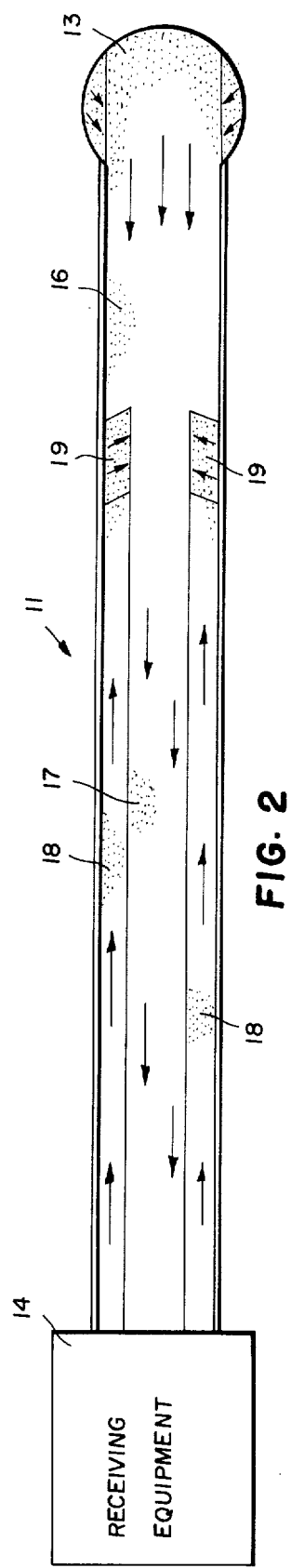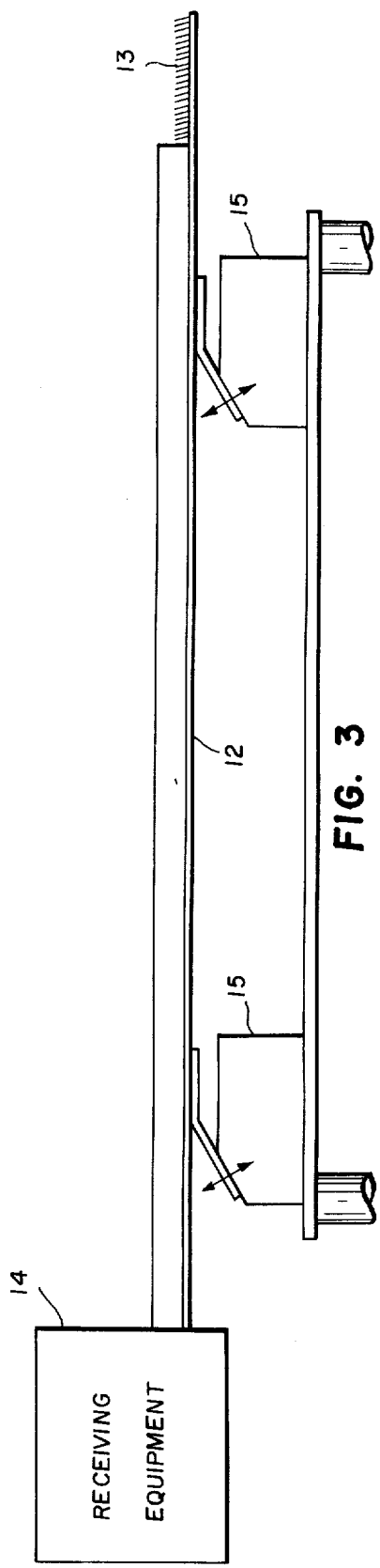

4,037,710

ACCUMULATOR FOR OBJECT FEEDER

RELATED APPLICATIONS

This is a continuation-in-part of my copending parent application, Ser. No. 487,385, filed July 11, 1974, entitled ACCUMULATOR FOR OBJECT FEEDER, and abandoned upon the filing of this application.

THE INVENTIVE IMPROVEMENT

Vibratory pile feeders are useful for feeding objects from an input region to an output region where the objects can be accepted by receiving equipment, and it is often desirable to give such a feeder an accumulation capacity so that a supply of objects can build up in the feeder without causing jams or possible damage to the objects. If the objects are allowed to collect at the output end of the feeder under the normal feeding force of the device, they tend to jam together forcefully, and can stop the output altogether. It is desirable to have the objects collect somewhere on the feeder in an available supply, but it is difficult to do this without causing jams that stop the flow.

The invention involves recognition of a way that a vibratory pile feeder can be arranged and operated as an object accumulator to store up a substantial supply of objects and continuously present objects to the receiving equipment without producing jams or damage to the objects, so that the feeder does not have to be closely regulated to the rate of acceptance of the receiving equipment. Then input ot the feeder can be relatively steady and undisturbed until the feeder accumulates a full capacity, and the feeder can continue to present its accumulated supply of objects to the receiving equipment for a substantial interval after the input of objects has been shut off. The invention aims at a simple, effective, and economical way of giving a vibratory pile feeder a substantial capacity as an object accumulator to relieve the problems involved in matching input rate to output rate.

The invention uses a substantially direct path from the input to the output to provide an output as quickly as possible after input of objects, and the invention involves recognition of the desirability of arranging the accumulator for quickly recirculating a relatively small accumulated supply of objects, and for more slowly recirculating a larger number of accumulated objects to eliminate any delay in waiting for the last of the accumulated objects to reach the output. In other words, the output is preferably supplied quickly and steadily without interruption from a minimum interval after input of objects until the last of the objects is input, without any gaps or delays in the output of objects. The invention also involves recognition of simple ways of meeting these requirements to provide an optimum accumulator for a vibratory object feeder.

SUMMARY OF THE INVENTION

The inventive accumulator applies to a vibratory object feeder having a vibrated base extending from an input region to an output region, and the base is covered with pile material having inclined bristles for moving the objects when the base vibrates. A feed portion of the pile material has bristles inclined from the vertical toward the output region and extends in a substantially direct route from the input region to the output region to provide an output of objects as soon as possible after input of the objects. An accumulator portion of the pile material is arranged adjacent the feed portion at the output region and includes a removal portion and a re-entry portion each adjacent to the feed portion with the re-entry portion being closer to the input than the removal portion. The bristle inclination direction of the removal portion leads away from the direction of motion of the objects, in the feed portion, and the bristle inclination direction of the re-entry portion leads toward the feed portion so the removal portion receives objects crowded out of the feed portion, and the re-entry portion moves the crowded-out objects back into the feed portion. The bristle inclination directions in the accumulator cooperate to move the crowded-out objects in a generally arcuate swirl through the removal portion and the re-entry portion and back to the feed portion, and the radially inner portion of the swirl forms a relatively short path for a relatively rapid re-entry to the feed portion for crowded-out objects pushed just outside the feed portion. Portions of the swirl radially outward from the inner portion form relatively longer paths up to many times the length of the short path for relatively slower re-entry to the feed portion for the crowded objects that are pushed relatively far away from the feed portion.

DRAWINGS

FIG. 1 is a partially schematic plan view of one form of the inventive accumulator for an object feeder showing one preferred flow of objects;

FIG. 2 is a partially schematic plan view of another form of the inventive device;

FIG. 3 is a partially schematic side elevational view of the device of FIG. 2;

DETAILED DESCRIPTION

Accumulators for vibratory object feeders according to the invention all involve some common components generally including vibrators and a vibrated base covered with a pile material having uniformly inclined bristles that support and move the objects along as the base vibrates. Vibrators can be formed and mounted in several different ways, and they vibrate the base preferably in a veritcal plane and preferably at an angle inclined above the horizontal. The bristles of the pile material are stiff enough and strong enough to support the objects being fed, but are also resilient enough to flex under the objects during the vibration for moving the objects along. The desired feed and accumulation is accomplished by arranging portions of the pile material with bristle inclination directions oriented in different ways to accomplish both a rapid direct feed of objects, and accumulation paths or regions both for accommodating as many objects as desired and for moving the objects promptly into the main feed path whenever space is available there to provide a steady and uninterrupted output of objects.

Figure 5:
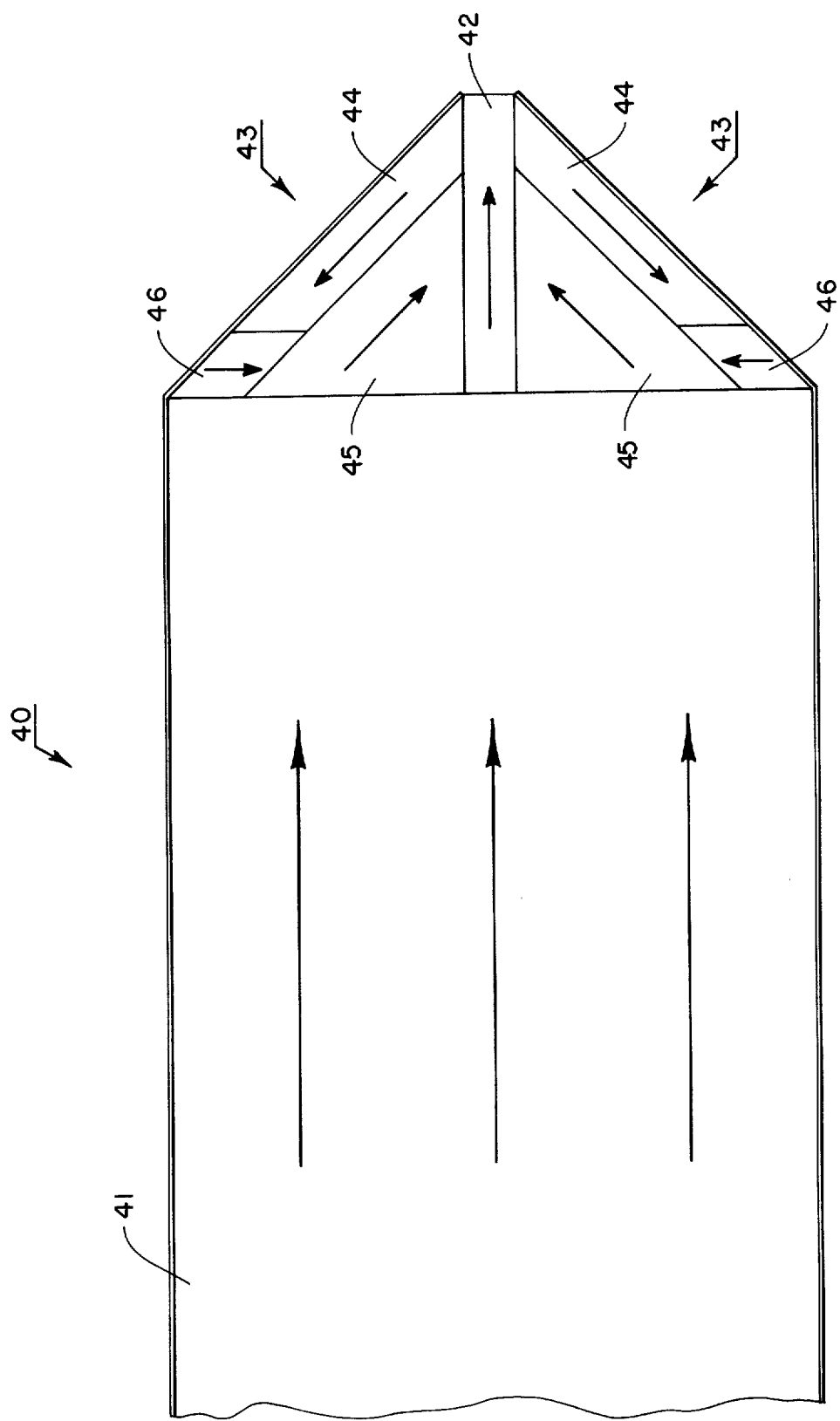
FIGS. 5—7 are partially schematic plan views of other preferred embodiments of the inventive accumulator.

The accumulators 10 and 11 of FIGS. 1 and 2 are similar enough so that FIG. 5 would be representative of either one. Each includes a base 12 underlying the entire feed path and extending from an input region 12 to receiving equipment 14. A pair of vibrators 15 support base 12 and drive base 12 in a generally reciprocal vibration in a vertical plane extending along the feed path from input region 13 to receiving equipment 14. As best shown in FIG. 3, the angle of vibration produced by vibrators 15 is inclined up from the horizontal toward receiving equipment 14. Bristle pile material 16 covers the upward facing surface of base 12 and has bristles uniformly inclined for resiliently supporting objects 20 on the bristle tips, and the angle of inclination of the bristles of pile material 15 is preferably from 5° to 25° from the vertical.

Base 12 can be formed of many materials in many shapes, but is preferably relatively elongated to extend from input region 13 to receiving equipment 14. Vibrators 15 can be made in many ways and can support base 12 through many different couplings to achieve the desired inclined vibration. Pile material 16 is preferably formed of resilient monofilament bristles secured in a base or backing and having a uniform height and sufficient density to form a relatively even surface of bristle tips supporting objects 20. The brisltes of pile 16 are preferably resilient to flex slightly when vibrated against objects 20 to move objects 20 in the direction of bristle inclination.

The first or main feed portion 17 of pile material 16 extends continuously from input region 13 to receiving equipment 14 with bristles inclined in the direction of the arrows leading straight toward receiving equipment 14 from input region 13. Pile portion 17 then cooperates with the vibration angle established by vibrators 15 to provide relatively fast movement of objects 20 from input region 13 straight through to receiving equipment 14.

A second pile portion 18 extends along one side of pile portion 17 in the embodiment of FIG. 1, and along both sides of the main pile portion 17 in the embodiment of FIG. 2, and has bristles inclined in the oppostie direction from the inclination direction of pile portion 17. The bristles of pile portion 18 then incline from the vertical away from receiving equipment 14 and back toward input region 13 as indicated by the arrows. Pile portions 18 extend only part-way back to input region 13, and because of the reverse bristle inclination direction, tend to move objects 20 back toward input reigon 13. However, because of the vibration inclination toward receiving equipment 14, the bristles of pile portions 18 are not as effective in feeding objects 20, and move objects 20 relatively slowly back toward input region 13. This means that if an oversupply of objects 20 occurs at receiving equipment 14, some of the objects 20 are crowded out onto second pile portion 18 and begin a relatively slow journey back toward input region 13. Because of the slow rate of travel of objects 20 along pile portions 18, a considerable number of objects 20 can accumulate on pile portions 18 as best shown in FIG. 1. Meanwhile, objects are delivered to receiving equipment 14 at the relatively faster rate provided by the main feeding pile portion 17 so that receiving equipment 14 is steadily supplied with objects, and pile portions 18 take up any oversupply in a relatively slow, reverse flow of objects 20.

A third or intermediate pile portion 19 fits between pile portions 18 and 17 at the end of pile portion 18 remote from receiving equipment 14. The bristles of pile portion 19 are inclined from the vertical in a direction indicated by the arrows which is angled relative to the bristle inclination directions of both pile portions 17 and 18. The bristle inclination direction of pile portion 19 is preferably about 45° to relative to the bristle inclination direction of pile portion 18 and extends toward adjacent pile portion 17 for moving objects 20 from the output end of pile portion 18 laterally toward main pile portion 17 for movement back toward receiving equipment 14. Pile portion 19 also diverts any incoming objects 20 from input region 13 laterally into main feed portion 17 to prevent any jamming of objects at the end of pile portion 18 remote from receiving equipment 14. Substantially all of the incoming objects 20 are then directed first into the main feed portion 17, sand accumulated objects flowing slowly back along pile portions 18 are directed back into main portion 17 for recirculation back toward receiving equipment 14.

A sensor 21 arranged in the region of third pile portion 19 detects any overaccumulation of objects 20 crowding into third pile portion 19 for recirculation and operates input control device 22 for stopping the input of objects 20 because a full supply of objects 20 has been accumulated. Sensor 21 can have many different forms, and input control device 22 can also be many different devices.

Figure 4:
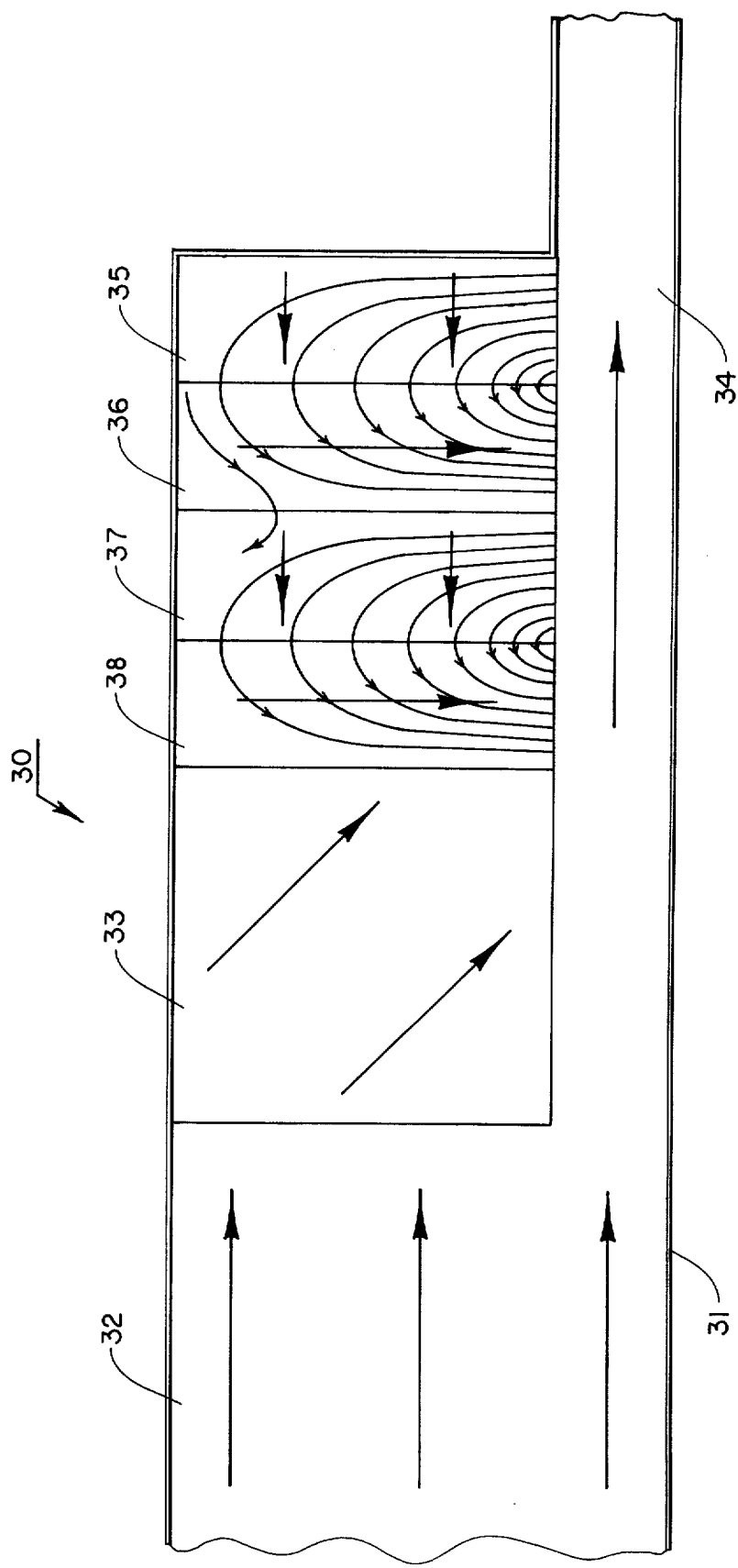
FIG. 4 is a schematic plan view of a preferred embodiment of the inventive accumulator showing two accumulator swirl patterns in series.

Conveyor 30 of FIG. 4 schematically shows a preferred objective in forming the inventive accumulator for an object feeder. It includes a base 31 that can be divided into as many sections as desired and powered by as many vibrators as desired for convenience in vibrating the entire base 31. Base 31 is covered with pile material having bristles uniformly inclined in directions indicated by straight arrows. The main feed portion of conveyor 30 extends along a relatively wide feed channel 32 extending for whatever length is desired from an input region, and leads to a converging portion 33 that directs the wider feed channel 32 into a narrower output portion or region 34. Output of objects through region 34 can be a single-file line of objects, or a stream several objects wide, depending upon the objects involved and the needs of the equipment receiving the objects. Accumulation of objects occurs in regions 35-38 as explained below.

Whenever an excessive number of objects are fed into output region 34, either because the output has temporarily stopped, or becuase the input rate exceeds the output rate, the objects jostle together, and some of them are crowded off of output region 34. The region that the object are most likely to be crowded onto first is removal region 35 that has pile bristles oriented in a direction opposite to the main feed direction in output region 34. Removal region 35 then receives the crowded-off objects and moves them rearwardly onto re-entry region 36 which has pile bristles oriented toward the main feed portion in output region 34. Region 36 then moves the crowded-out objects back toward the feed portion for re-entry into the output region if space permits. Objects seeking re-entry into the main feed flow output region 34 can be moved along the edge of output region 34, and can be crowded back onto removal region 35. Also, as the number of objects increases above the possible output capacity, more and more objects are crowded onto removal region 35 where they are pushed farther and farther from output region 34 as they seek a path into re-entry region 36. This produces an arcuate swirl of objects schematically represented by the arching arrowed lines. The swirl grows in diameter with increase in the number of objects crowded out of output region 34.

As space becomes available in the flow of objects proceeding along output region 34, re-entry section 36 moves objects into the available space as they swing around the arcuate swirl pattern, and re-entry of objects into output region 34 gradually reduces the diameter of the swirl, so long as additional objects are not crowded out of the output region 34 and back into the swirl pattern. The swirl of objects can also stop spinning temporarily remain nearly motionless for a brief interval, especially if additional objects are not crowded into the swirl, and if sace remains unavailable in output region 34.

Accumulator portions 37 and 38 form another swirl pattern in removal portion 37 and re-entry portion 38 to form two swirls in series for accumulating a larger number of objects. The swirl in sections 35 and 36 can become large enough so that some objects are crowded onto section 37 where they flow toward section 38 and then toward the main feed portion 34 for re-entry. Also, objects cab be crowded directly onto removal section 37 from output region 34. The swirl pattern established in sections 37 and 38 behaves in the same general way as the swirl in sections 35 and 36, and the two swirls can accumulate substantially twice as many objects as a single swirl.

The same pattern of removal sections and re-entry sections can be repeated for three or four or more swirls along one side of an output path, and can also be arranged on opposite sides of the output path. As space in the output path permits, each of the swirls re-enters objects into the output path and reduces in diameter as the number of objects in the swirl diminish so that there is substantially no delay in re-entering the last of the accumulated objects into the output path. This means that if the input stops, the last of all the objects in the accumulator will follow a preceding object directly into the output without any delay, and it is not necessary for object-receiving equipment to wait for the last few objects to make their way in from a remote region of the device.

Section 38 also assists in funneling the wider flow of objects from path 32 into the narrow output path 34 by reinforcing the oblique diversion of objects accomplished by section 33.

Feeder 40 of FIG. 5 has a main feed path 41 leading to a narrower output path 42, and a pair of accumulators 43 are arranged on opposite sides of output path 42. Two opposing swirl patterns are established by accumulators 43 in the same general way as described above relative to FIG. 4, except that bristle orientation directions are somehwat different. Removal regions 44 have bristles inclined in the direction of the arrows obliquely away from output region 42 in a generally reverse direction, and re-entry regions 45 have bristles oriented in a direction inclined back toward output region 42. Intermediate portions 46 are arranged at the output ends of removal portions 44 and have bristles oriented directly toward re -entry portions 45 for directing objects from removal section 44 back toward re-entry section 45. As viewed in FIG. 5, the swirl of objects below output path 42 is clockwise, and the swirl of objects above output path 42 is counterclockwise. Each swirl grows in diameter, as explained above, with the addition of objects crowded out of output region 42. Also, re-entry regions 45 and intermediate regions 46 help in forming a funnel flow of objects from wider feed portion 41 into narrower output path 42.

Figure 6:
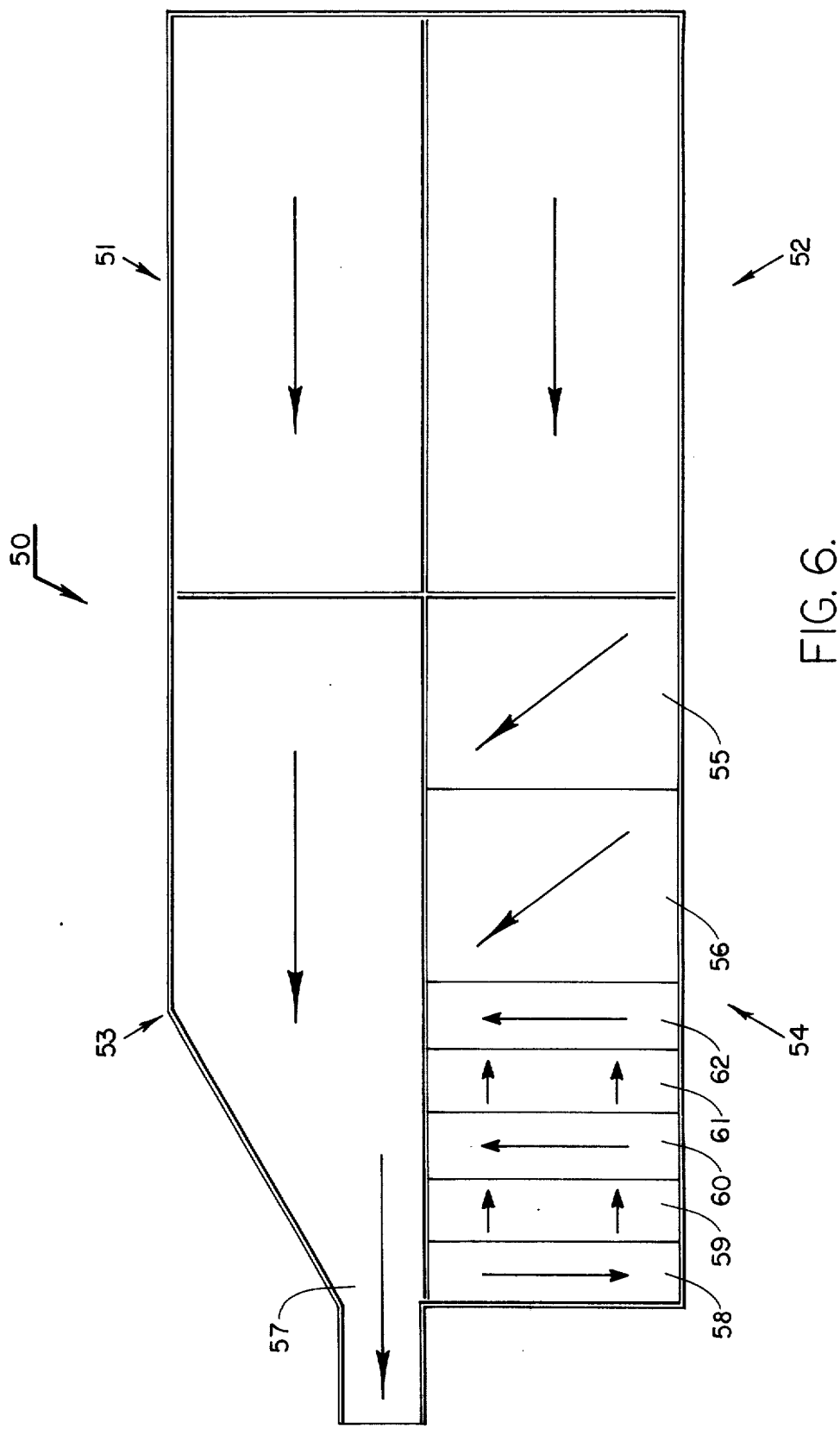
Figure 7:
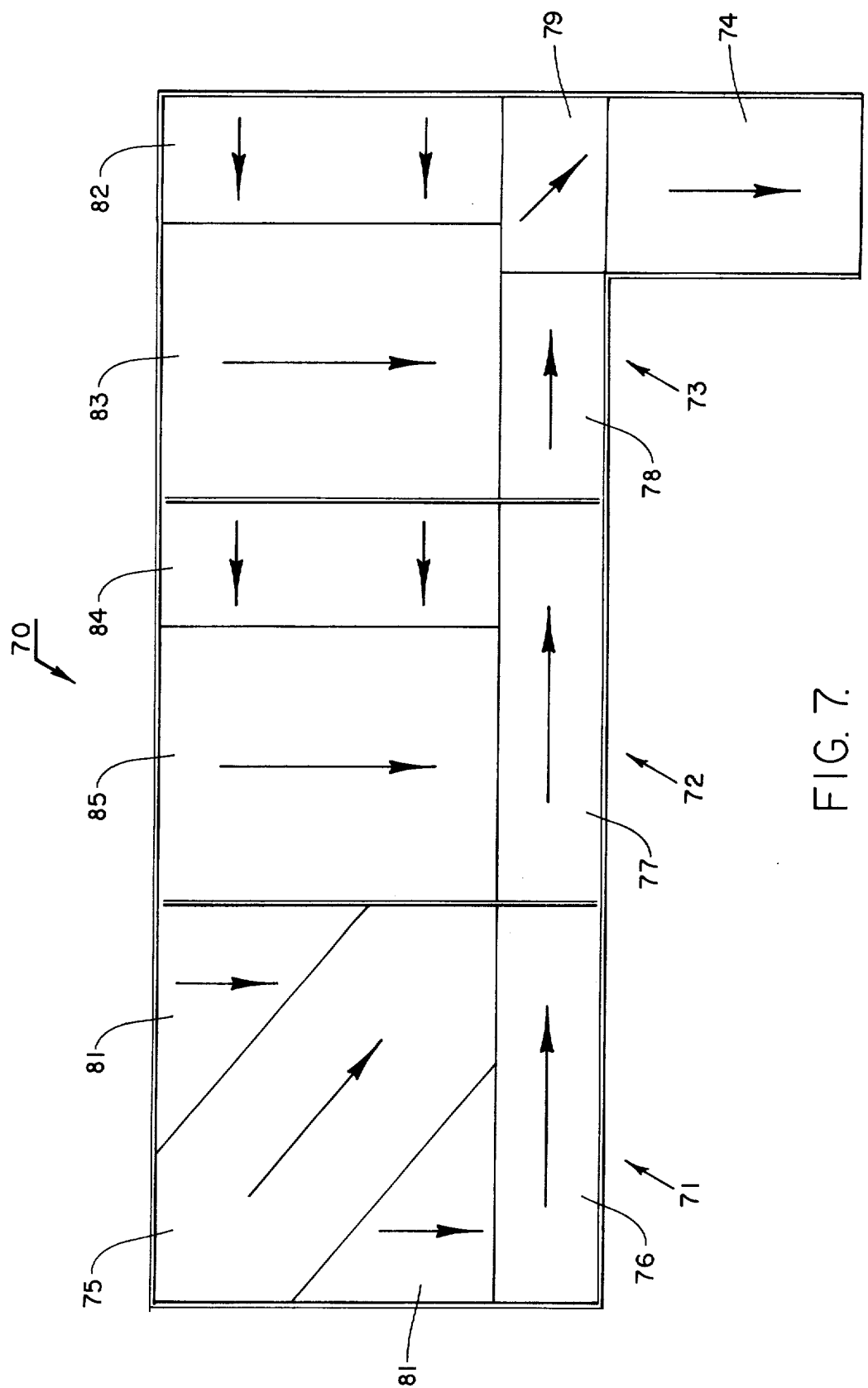

Feeder 50 of FIG. 6 is divided into sections 51-54, with sections 51-53 providing the main feed flow, and section 54 assisting in the main feed flow and providing the accumulator. Regions 55 and 56 of section 54 have bristles oriented obliquely to funnel objects flowing in the wider stream established by sections 51 and 52, into the narrower output region 57 of section 53. Sections 51-53 are preferably vibrated in a vertical plane in a reciprocal motion angled above the horizontal to move toward output region 57 on the upstroke and away from ouput region 57 on the downstroke. The vibration of section 54 is preferably reversed to move away from ouput region 57 on the upstroke and toward output region 57 on the downstroke. This gives objects a slight reverse flow bias in section 54 and enhances the diverting or funneling effect of regions 55 and 56.

Section 54 has an accumulator formed of regions 58-62 providing two swirl patterns for objects crowded of output region 57. The bristle inclinations of the pile material in regions 58-62 are oriented as shown by the arrows, and a first swirl pattern is formed by regions 58-60 and a second swirl pattern is formed by regions 61 and 62.

The bristle inclination in region 58 is oriented transversely away from output region 57, but the preferred vibration direction for section 54 biases the crowded-out objects in a reverse direction, so that objects tend to flow obliquely in a reverse direction across removal region 58. Region 59 can be considered either as a second removal region for objects crowded out of output region 57, or as an intermediate region directing objects in a reverse flow toward re-entry region 60. The swirl path for a few crowded-out objects then leads into removal regions 58 and 59 and flows in a reverse direction alongside the output path of region 57 and re-enters output region 57 from re-entry output region 57 from re-entry region 60 as soon as space is available. As more and more objects are crowded into regions 58-60, the diameter of the swirl pattern increases as explained above.

Spillover from the swirl pattern of regions 58-60 moves into removal region 61 along with any objects crowded directly into removal region 61 from output region 57. A second swirl pattern then forms in removal region 61 and re-entry region 62 and changes diameter with the number of crowded-out objects as explained above. Re-entry region 62 also assists funnel flow region 56 in forcing the wider stream of objects into the narrower stream through output region 57.

Feeder 70 shows another preferred emobdiment of the invention having a base divided into three sections 71-73 for convenience of size nd configuration and to allow each section to be driven by separate vibrators. These all preferably vibrate at an angle inclined above the horizontal and oriented in the direction from section 71 toward section 73. Output from feeder 70 is Zthrough a channel 74 and input is in region 75, and feeding and accumulating are produced by arrangement of bristle inclination orientations as described above.

The bristles of the pile material in input region 75 are inclined in an oblique direction leading toward a main feed path formed by regions 76 and 77 leading toward output a main feed path formed by regions 76 and 77 leading toward output regions 78 and 79. This moves objects obliquely across section 71 for travel along the edge of feeder 70 having the main feed path. Regions 81 have bristles inclined directly toward feed path region 76 to assist in urging objects toward the main feed path.

Regions 82-85 form accumulators according to the invention and have bristle inclination directions as shown by arrows. Objects crowded out of output region 79 are received by removal region 82 which cooperates with re-entry region 83 in forming a variable diameter swirl pattern as previously described. Removal region 84 and re-entry region 85 form another swirl pattern for objects crowded out of feed path 77 and into removal path 84, and the swirl pattern in regions 84 and 85 also varies in diameter. Spillover from the swirl pattern in region 83 enters region 84 to join its accumulator swirl. Objects in the swirls are re-entered into the main feed path as soon as space is available, and the diameters of the swirls are related to the number of objects accumulated as previously explained.

One of the advantages of arranging pile material to form swirl patterns for accumulation of objects according to the invention is that the objects that are pushed just outside of the feed portion follow a relatively short path along a radially inward part of the swirl and are re-entered to the feed portion relatively rapidly if space permits. When accumulation of a relatively larger number of objects pushes objects relativley far away from the main feed portion, they travel in a much longer path along a radially outer portion of the accumulator swirl, and the longer path is many times the length of the shortest possible path for a relatively slower re-entry of the outer objects of the swirl. The swirl diameter reduces directly and automatically as the number of objects accumulated in the swirl diminishes so that the last of the accumulated objects is re-entered into the feed portion as soon as space is available without any unnecessary delay.

An accumulator recirculation path having a fixed distance for object travel lacks these advantages. For example, if one of the last few objects in the output region is crowded out of the output region onto the accumulation path, it might have to travel along a relatively long predetermined route for a considerable time before it returns to the output region, and this might cause a gap or delay in retrieving the last few objects from the feeder. Accumulator swirls according to the invention avoid this and also have a size automatically related to the invention avoid this and also have a size automatically related to the number of objects accumulated in the swirl for automatic adjustment and elimination of delay.

The several preferred embodiments illustrated in the drawings show variations in ways the invention can be applied to different feeders and also suggest to those skilled in the art that many other variations are possible in applying the invention to specific feeders. Workers in the art will also appreciate the many ways that feeders can be divided into sections, can be supported and vibrated, and can use variations in pile material oriented as generally suggested by the invention to achieve accumulation of objects in swirl patterns alongside the main feed output.

I claim:

1. An object accumulator for a feeder having a vibrated pile material oriented to direct the flow of objects, a feed portions of said pile material being oriented to form a substantially direct object feed route from an input region to an output region, an accumulator portion of said pile material being arranged adjacent and alongside said feed portion at said output region and at the same level as said feed portion, and said accumulator comprising:

a. a removal portion of said vibrated pile material directly adjacent said feed portion at said output region and oriented relative to the vibration direction of said accumulator to move said objects generally rearwardly relative to the direction of motion of said objects in said feed portion of said output region so that objects crowded out of said feed portion in said output region are pushed onto said removal portion without resistance from the orientation of any of said pile material to prevent jamming if said objects in output region, and said crowded-out objects are moved generally rearwardly of said feed direction;

b. a re-entry portion of said vibrated pile material directly adjacent said feed portion upstream of and adjacent to said removal portion and oriented in a direction extending toward said feed portion for receiving said crowded-out objects from said removal portion and moving said crowded-out objects back toward said feed portion;

c. said removal portion and said re-entry portion being oriented and dimensioned relative to the size of said objects and said vibration direction of said accumulator to cooperate in moving said crowded-out objects in a generally arcuate swirl held outside said feed portion by crowding contact with said objects in said feed portion of said output region, said swirl variably accumulating from one to many of said objects, the distance across said swirl varying with the number of said objects crowded into said swirl, and said objects in said swirl being in crowded-together contact with each other and with said objects in said feed portion;

d. the radially inner portion of said swirl forming a relatively short path of substantially minimum length for a relatively rapid re-entry to said feed portion for said crowded-out objects pushed just outside of said feed portion;

e. portions of said swirl radially outward from said inner portion forming relatively longer paths up to many times the length of said short path for relatively slower re-entry to said feed portion for said crowded-out objects pushed relatively far away from said feed portion; and f. said swirl returning said crowded-out objects to said feed portion as soon as space in said feed portion is available.

2. The accumulator of claim 1 wherein said removal portion is oriented in a direction extending obliquely away from said direction of motion in said feed portion, said re-entry portion is oriented in a direction extending obliquely toward said direction of motion in said feed portion, and including an intermediate portion adjacent said removal portion and said re-entry portion and oriented in a direction leading from said removal portion toward said re-entry portion.

3. The accumulator of claim 1 including an intermediate portion adjacent said removal portion and said re-entry portion and oriented in a direction leading from said removal portion toward said re-entry portion.

4. The accumulator of claim 1 including a plurality of said accumulators adjacent each other along said feed portion to provide a corresponding plurality of said swirls.

5. The accumulator of claim 1 including a plurality of said accumulators arranged on opposite sides of said feed portion.

* * * * *